United States Patent Office 3,538,228
Patented Nov. 3, 1970

3,538,228
PHARMACEUTICAL PREPARATIONS COMPRISING SULPHUR-CONTAINING AMINO-COMPOUNDS FOR THE TREATMENT OF DEPRESSIVE CONDITIONS AND METHODS THEREFOR
Mohan Damodaran Nair, Bombay, India, assignor to Ciba Limited, Basel, Switzerland, a company of Switzerland
No Drawing. Continuation-in-part of application Ser. No. 640,477, May 23, 1967. This application June 10, 1968, Ser. No. 735,584
Claims priority, application Switzerland, June 3, 1966, 8,085/66
Int. Cl. A61k 27/00
U.S. Cl. 424—325
12 Claims

ABSTRACT OF THE DISCLOSURE

Pharmaceutical preparations for the treatment of depressive conditions comprise an effective amount of a compound of the formula

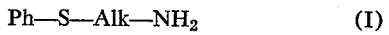
$$Ph-S-Alk-NH_2 \qquad (I)$$

in which Ph represents a substituted phenyl group and Alk is an alkylene separating S and N by at least 2 carbon atoms, and salts thereof.

CROSS-REFERENCES TO RELATED APPLICATIONS

This is a continuation-in-part of application Ser. No. 640,477, filed May 23, 1967, now abandoned.

BACKGROUND OF THE INVENTION

Depressive conditions are generally treated by means of stimulants. It is, however, known that general stimulants frequently cause a stimulation of motor activity as an undesired side-effect, and can also result in loss of muscular coordination and an effect on spinal reflexes. It is, therefore, desirable that, when treating depressive conditions, preparations be used which are not of a generally stimulating nature and in which the undesired side-effects are almost entirely missing.

The present invention concerns pharmaceutical preparations comprising arylmercapto-alkylamines of the formula

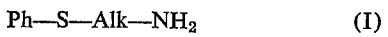
$$Ph-S-Alk-NH_2 \qquad (I)$$

in which Ph is a phenyl group substituted by a member selected from the group consisting of lower alkyl, hydroxy, lower alkoxy, lower alkylenedioxy, halogeno, trifluoromethyl, amino, di-lower alkyl-amino, lower alkanoylamino, carboxy and carbo-lower alkoxy, and Alk represents a lower alkylene group with up to 7 carbon atoms separating the sulfur from the nitrogen atom by at least 2 carbon atoms, or pharmaceutically acceptable acid addition salts thereof, and method for the treatment of depressive conditions using the above phamaceutical compositions. It has been found, that the above compounds show specific antidepressive effects of prolonged duration in doses of about 0.0002 to about 0.002 g./kg.; in animal experiments, e.g. with mice, the above compounds reverse reserpine induced hypothermia and respond positively to the DOPA test (Federation Proceedings, 1964, 23, 198).

Furthermore, the compounds lack the above mentioned undesired side-effects, and other undesired, for example, anticonvulsive and hypotensive properties are almost entirely missing; the absence of these undesired side-effects can be demonstrated by means of tests with experimental animals, such as mice, rats, cats, rabbits and monkeys.

DESCRIPTION OF THE PREFERRED EMBODIMENTS

The invention primarily relates to pharmaceutical preparations useful in the medicinal treatment of depressive conditions characterized by comprising a therapeutically effective dose of one of the above compounds of the Formula I.

The substituted phenyl group Ph contains one, two or more of the above substituents which may be identical or different. Lower alkyl represents, for example, methyl, ethyl, propyl, isopropyl or tertiary butyl, lower alkoxy, e.g. methoxy or ethoxy, as well as lower alkylenedioxy, e.g. methylenedioxy, and halogen, for example, fluorine, chlorine or bromine atoms. Di-lower alkyl-amino groups are, for example, dimethylamino or diethylamino, and lower alkanoylamino e.g. acetylamino, whereas carbo-lower alkoxy represents, for example, carbomethoxy or carbethoxy.

The lower alkylene residue Alk contains up to 7, primarily 2–5 carbon atoms; such residues are, for example, 1,2-ethylene or 1,2-propylene, 2,3-propylene or 1,3-propylene, as well as 1,2-butylene, 2,3-butylene, 1,3-butylene or 1,4-butylene, or 1,4-pentylene or 1,5-pentylene groups.

The new 1-(2-methyl-phenyl)-mercapto - 2 - propylamine and its pharmaceutically acceptable acid addition salts are especially suited as antidepressive ingredients of the pharmaceutical compositions of this invention.

The pharmaceutically active ingredients may be used in the free form or in the form of phamaceutically usable acid addition salts. These are, for example, salts with inorganic acids, such as hydrochloric, hydrobromic, nitric, sulphuric or phosphoric acids, but also with organic acids, such as organic carboxylic acids, for example, acetic, propionic, glycollic, malonic, succinic, maleic, hydroxymaleic, dihydroxymaleic, fumaric, malic, tartaric, citric, benzoic, cinnamic, mandelic, salicylic, 4-aminosalicylic, 2-phenoxybenzoic, 2-acetoxybenzoic, embonic, glucuronic, nicotinic or isonicotinic acids, or organic sulphonic acids, e.g. methanesulphonic, ethanesulphonic, 2-hydroxyethanesulphonic, 1,2-ethanedisulphonic, benzenesulphonic, p-toluene-sulphonic, 2-naphthalenesulphonic or N-cyclohexylsulfamic acids. In view of the close relationship between the compounds in the free form and in the form of their salts, whenever the free compounds or the salts are referred to in this context, the corresponding salts and free compounds, respectively, are also intended, such being possible or appropriate under the circumstances.

The pharmaceutical preparations of this invention usually contain the active ingredient together with a pharmaceutically acceptable, organic or inorganic, solid or liquid, excipient suitable for enteral e.g. oral, or parenteral application. Possible excipients are, for example, water, gelatine, sugars, such as glucose, lactose or fructose, starches, such as corn rice or wheat starch, colloidal silica, stearic acid or its salts, such as magnesium stearate or calcium stearate, talc, vegetable oils, rubber, polyalkylene glycols or other known fillers, disintegrating agents and/or lubricants. The preparations may, for example, be in the form of tablets, dragees, powders, or suppositories, or in a liquid form, e.g. as solutions, suspensions or emulsions. They are optionally sterilised and/or contain auxiliary substances, such as preservatives, stabilisers, wetting or or emulsifying agents, salts for controlling the osmotic pressure, buffers, dyestuffs or flavors. They may optionally also contain other therapeutically valuable substances and are formulated by methods usually employed for the manufacture of pharmaceutical preparations.

In order to treat depressive conditions, daily dosages of about 0.01 g. to about 0.2 g., preferably of about 0.02 g. to about 0.2 g., and especially about 0.05 g. to about 0.15 g., of the active substance are administered enterally, for example, orally, and daily dosages of about 0.01 g. to about 0.05 g. are employed parenterally, for example, intramuscularly.

The pharmaceutical preparations as used, for example, in treating depressive conditions, are characterized by a therapeutically effective amount, especially by a content of about 0.01 g. to about 0.15 g., preferably of about 0.01 g. to about 0.1 g. and especially of about 0.02 g. to about 0.05 g. per unit dose, of one of the compounds of Formula I, together with a pharmaceutically usable excipient.

The active ingredients of the pharmaceutical preparations of this invention having the Formula I are known or may be produced by methods which are in themselves known, e.g. by treating a compound of the formula Ph—SH or a salt thereof with an $\alpha,\beta$-alkyleneimine or with a reagent capable of being converted thereto. They may also be obtained by converting in a compound of the formula Ph—S—Alk—$R_o$, in which $R_o$ denotes a residue which may be converted into an amino group, for example, an acylamino group, such as the formylamino group, a phthalimido group or a carboxyamino group, or an isocyanato or isothiocyanato group, as well as a reactive esterified hydroxyl group, or a nitro or nitroso group, furthermore a cyano or carbamyl group, the group $R_o$ into the desired amino or aminomethyl group (in case $R_o$ represents a cyano or carbamyl group) by methods which are in themselves known, such as hydrolysis or hydrazinolysis, treatment with ammonia or reagents which release ammonia, or reduction. Resulting free compounds may be converted to their acid addition salts by methods in themselves known, such as treatment with a suitable acid. The salts obtained may be converted to the free compounds, for example, by treatment with a base, or to other salts, for example, by treatment with a suitable ion exchanger or with metal salts.

The following examples illustrate the invention without however limiting it. The temperatures are given in degrees centigrade.

Example 1

Tablets containing 0.02 g. of the active substance are prepared as follows:

| Constituents (for 5000 tablets): | G. |
|---|---|
| 1-(2-methyl-phenyl)-mercapto - 2 - propylamine hydrochloride | 100 |
| Corn starch | 800 |
| Talc | 70 |
| Magnesium stearate | 30 |
| Distilled water | Q.s. |

The 1-(2-methyl-phenyl)-mercapto-2-propylamine hydrochloride and 650 g. of the corn starch are thoroughly mixed with one another and treated with a paste prepared from 150 g. of corn starch and 500 g. of distilled water. The mass is thoroughly kneaded, granulated and dried at 45°. The mixture of the talc and the magnesium stearate is added to the granules and thoroughly mixed therewith. The product is converted to tablets weighing 0.2 g.

Tablets containing 0.05 g. of the active substance are obtained by converting the mass described above into tablets, each weighing 0.5 g. (for 2000 tablets).

Example 2

Tablets containing 0.025 g. of active substance are produced as follows:

| Constituents (for 10,000 tablets): | G. |
|---|---|
| 1-(2-Aminophenyl)-mercapto - 2 - propylamine dihydrochloride | 250 |
| Corn starch | 1550 |
| Talc | 140 |
| Magnesium stearate | 60 |
| Distilled water | Q.s. |

The 1-(2-aminophenyl)-mercapto-2-propylamine dihydrochloride and 1300 g. of the corn starch are thoroughly mixed with one another and treated with a paste prepared from 250 g. of corn starch and 1000 g. of distilled water. The mass is thoroughly kneaded, granulated and dried at 45°. The mixture of the talc and the magnesium stearate is added to the granules and thoroughly mixed therewith. The product is converted to tablets weighing 0.2 g.

Tablets containing 0.05 g. of active substance are obtained by converting the mass described above into tablets weighing 0.5 g. (for 4000 tablets).

Example 3

Tablets containing 0.025 g. of active substance are produced as follows:

| Constituents (for 1000 tablets): | G. |
|---|---|
| 2-(4-Chlorophenyl)-mercapto-ethylamine hydrochloride | 25 |
| Corn starch | 155 |
| Talc | 14 |
| Magnesium stearate | 6 |
| Distilled water | Q.s. |

The tablets are produced as described in Examples 1 and 2.

Example 4

Tablets containing 0.03 g. of active substances are produced as follows:

| Constituents (for 10,000 tablets): | G. |
|---|---|
| 2-(4-methylphenyl)-mercapto-ethylamine hydrochloride | 300 |
| Corn starch | 1500 |
| Talc | 140 |
| Magnesium stearate | 60 |
| Distilled water | Q.s. |

Tablets are produced by the method described in Examples 1 and 2.

Example 5

A solution of 50.0 g. of 1-(4-methyl-phenyl)-mercapto-ethylamine hydrochloride in distilled water is diluted with distilled water to a volume of 5000 ml. The solution is filtered through a sintered glass and the clear filtrate is dispensed in 1 ml., 2 ml. or 5 ml. quantities in glass ampoules. These are sealed and sterilised in an autoclave at 120° for 30 minutes.

Example 6

A solution of 50.0 g. of 1-(2-methyl-phenyl)-mercapto-2-propylamine hydrochloride in distilled water is diluted with distilled water to a volume of 5000 ml. The solution is filtered through a sintered glass and the clear filtrate is dispensed in 1 ml., 2 ml. or 5 ml. quantities in glass ampoules. These are sealed and sterilised in an autoclave at 120° for 30 minutes.

Example 7

A solution of 50.0 g. of 1-(2-aminophenyl)-mercapto-2-propylamine hydrochloride in distilled water is diluted with distilled water to a volume of 5000 ml. The solution is filtered through a sintered glass and the clear filtrate is dispensed in 1 ml., 2 ml. or 5 ml. quantities in glass ampoules. These are sealed and sterilised in an autoclave at 120° for 30 minutes.

The compounds used in the above examples as active compounds may be, for example, prepared as follows:

Example A

A solution of 5 g. of o-thiocresol in 50 ml. of methanol is treated dropwise with cooling, at a temperature below 35°, with 2.4 ml. of 1,2-propyleneimine, and allowed to stand for 20 minutes at room temperature. The reaction mixture containing 1-(2-methylphenylmercapto)-2-propylamine is adjusted to pH 4 by adding concentrated hydrochloric acid. The clear solution is concentrated to a volume of 10 ml. under reduced pressure and is diluted with ether. The crystalline precipitate is filtered off, washed with ether, dried and recrystallised from a mixture of ethanol and ether; one thus obtains the 1-(2-methyl-phenylmercapto)-2-propylaminohydrochloride of the formula

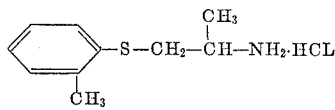

which melts at 168–169°.

Example B

A solution of 5.0 g. of o-aminothiophenol in 50 ml. methanol is treated dropwise with cooling, at a temperature below 35°, with 2.5 ml. of 1,2-propyleneimine, and allowed to stand at room temperature for 15 minutes. The reaction mixture containing 1-(2-aminophenyl)-mercapto-2-propylamine is adjusted to pH 4.0 by addition of concentrated hydrochloric acid. The solution is concentrated to a volume of 10 ml. under reduced pressure and treated with ether. The solid is filtered off and crystallised from ethanol; one thus obtains 1-(2-aminophenyl)-mercapto-2-propylamine hydrochloride of formula

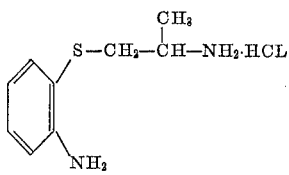

which melts at 186–188°.

I claim:

1. A pharmaceutical preparation in the form of a member selected from the group consisting of tablets, dragees, powders or suppositories, comprising about 0.01 g. to about 0.15 g. per dosage unit of a member selected from the group consisting of an aryl-mercapto-alkylamine of the formula Ph—S—Alk—NH$_2$ in which Ph is phenyl substituted by a member selected from the group consisting of lower alkyl, hydroxy, lower alkoxy, lower alkylenedioxy, halogeno, trifluoromethyl, amino, di-lower alkylamino, lower alkanolyamino, carboxyl and carbo-lower alkoxy, and Alk is alkylene with up to 7 carbon atoms, separating the sulfur atom from the nitrogen atom by at least 2 carbon atoms, and a pharmaceutically acceptable acid addition salt thereof, together with a pharmaceutically acceptable carrier.

2. A pharmaceutical preparation according to claim 1, wherein the aryl-mercapto-alkylamine is a member selected from the group consisting of a compound of claim 1 and a pharmaceutically acceptable acid addition salt thereof, in which Ph is a member selected from the group consisting of phenyl substituted by lower alkyl, phenyl substituted by lower alkoxy, phenyl substituted by lower alkylendioxy, phenyl substituted by halogeno, and phenyl substituted by trifluoromethyl, and Alk is an alkylene radical having 2–3 carbon atoms and separating the sulfur from the nitrogen atom by 2–3 carbon atoms.

3. A pharmaceutical preparation according to claim 1, wherein the aryl-mercapto-alkylamine compound is a member selected from the group consisting of the 1-(2-methyl-phenyl)-mercapto-2-propylamine and a pharmaceutically acceptable acid addition salt thereof.

4. A pharmaceutical preparation according to claim 1, containing from about 0.01 g. to about 0.1 g. of the active ingredient per dosage unit.

5. A pharmaceutical preparation according to claim 1, containing from about 0.02 g. to about 0.05 g. of the active ingredient per dosage unit.

6. A pharmaceutical preparation according to claim 2, containing from about 0.01 g. to about 0.1 g. of the active ingredient per dosage unit.

7. A pharmaceutical preparation according to claim 2, containing from about 0.02 g. to about 0.05 g. of the active ingredient per dosage unit.

8. A pharmaceutical preparation according to claim 3, containing from about 0.01 g. to about 0.1 g. of the active ingredient per dosage unit.

9. A pharmaceutical preparation according to claim 3, containing from about 0.02 g. to about 0.05 g. of the active ingredient per dosage unit.

10. Process for the treatment of depressive conditions which comprises administering to an animal a pharmaceutical preparation containing from about 0.01 g. to about 0.15 g. of a member selected from the group consisting of an aryl-mercapto-alkylamine compounds of the formula Ph—S—Alk—NH$_2$ (I)

in which Ph is a member selected from the group consisting of phenyl substituted by a member selected from the group consisting of lower alkyl, hydroxy, lower alkoxy, lower alkylenedioxy, halogeno, trifluoromethyl, amino, di-lower alkyl-amino, lower alkanoylamino, carboxyl and carbo-lower alkoxy, and Alk is alkylene with up to 7 carbon atoms separating the sulfur atom from the nitrogen atom by at least 2 carbon atoms, and a pharmaceutically acceptable acid addition salt thereof, together with a pharmaceutically acceptable carrier.

11. Process for the treatment of depressive conditions according to claim 10, wherein the aryl-mercapto-alkylamine compound or the pharmaceutically acceptable acid addition salt thereof is one in which Ph is a member selected from the group consisting of phenyl substituted by lower alkyl, phenyl substituted by lower alkoxy, phenyl substituted by lower alkylenedioxy, phenyl substituted by halogeno, and phenyl substituted by trifluoromethyl, and Alk is an alkylene radical having 2–3 carbon atoms and separating the sulfur from the nitrogen atom by 2–3 carbon atoms.

12. Process for the treatment of depressive conditions according to claim 10, wherein the aryl-mercapto-alkylamine compound is a member selected from the group consisting of the 1-(2-methyl-phenyl)-mercapto-propyl-2-amine and a pharmaceutically acceptable acid addition salt thereof.

References Cited

UNITED STATES PATENTS

| 2,765,338 | 10/1956 | Suter | 260—570.5 |
| 2,769,839 | 11/1956 | Fincke | 260—570.5 |
| 3,205,136 | 9/1965 | Godfrey | 260—570.7 |
| 3,142,554 | 7/1964 | Tedeschi | 260—570.7 |
| 3,221,054 | 11/1965 | Arnola | 260—570.7 |

OTHER REFERENCES

Chem. Abst., 41, p. 2694G (1947).
Chem. Abst., 64, p. 12604a (1966).

STANLEY J. FRIEDMAN, Primary Examiner

U.S. Cl. X.R.

424—282, 309, 317, 337